(12) United States Patent
Whitehead et al.

(10) Patent No.: US 7,808,428 B2
(45) Date of Patent: Oct. 5, 2010

(54) GNSS RECEIVER AND EXTERNAL STORAGE DEVICE SYSTEM AND GNSS DATA PROCESSING METHOD

(75) Inventors: Michael L. Whitehead, Scottsdale, AZ (US); Bradley P. Badke, Chandler, AZ (US); John A. McClure, Scottsdale, AZ (US); Steven R. Miller, Scottsdale, AZ (US)

(73) Assignee: Hemisphere GPS LLC, Calgary (CA)

( * ) Notice: Subject to any disclaimer, the term of this patent is extended or adjusted under 35 U.S.C. 154(b) by 0 days.

(21) Appl. No.: 12/247,139

(22) Filed: Oct. 7, 2008

(65) Prior Publication Data

US 2009/0091496 A1 Apr. 9, 2009

Related U.S. Application Data

(60) Provisional application No. 60/978,276, filed on Oct. 8, 2007.

(51) Int. Cl.
*G01S 19/38* (2010.01)
(52) U.S. Cl. .................................. 342/357.21
(58) Field of Classification Search ............ 342/357.06, 342/357.12, 357.13, 357.15; 701/213, 215
See application file for complete search history.

(56) References Cited

U.S. PATENT DOCUMENTS

| | | | |
|---|---|---|---|
| 4,894,662 A * | 1/1990 | Counselman | 342/357.12 |
| 5,134,407 A | 7/1992 | Lorenz et al. | |
| 5,185,610 A | 2/1993 | Ward et al. | |
| 5,268,695 A | 12/1993 | Dentinger et al. | |
| 5,296,861 A | 3/1994 | Knight | |
| 5,323,322 A | 6/1994 | Mueller et al. | |
| 5,471,217 A | 11/1995 | Hatch et al. | |
| 5,477,228 A | 12/1995 | Tiwari et al. | |
| 5,477,458 A | 12/1995 | Loomis | |
| 5,864,315 A | 1/1999 | Welles et al. | |
| 5,899,957 A | 5/1999 | Loomis | |
| 5,943,008 A | 8/1999 | Dusseldorp | |
| 5,969,670 A | 10/1999 | Kalafus et al. | |
| 6,018,313 A | 1/2000 | Englemayer et al. | |
| 6,061,390 A | 5/2000 | Meehan et al. | |
| 6,069,583 A | 5/2000 | Silvestrin et al. | |
| 6,144,335 A | 11/2000 | Rogers | |
| 6,191,730 B1 | 2/2001 | Nelson, Jr. | |
| 6,198,430 B1 | 3/2001 | Hwang et al. | |
| 6,229,479 B1 | 5/2001 | Kozlov et al. | |
| 6,259,398 B1 | 7/2001 | Riley | |
| 6,292,132 B1 | 9/2001 | Wilson | |
| 6,397,147 B1 | 5/2002 | Whitehead | |
| 6,469,663 B1 | 10/2002 | Whitehead et al. | |
| 6,754,584 B2 | 6/2004 | Pinto et al. | |
| 6,792,380 B2 | 9/2004 | Toda | |
| 6,865,484 B2 | 3/2005 | Miyasaka | |
| 7,027,918 B2 | 4/2006 | Zimmerman et al. | |
| 7,292,186 B2 | 11/2007 | Miller et al. | |
| 7,428,259 B2 | 9/2008 | Wang et al. | |
| 2007/0285308 A1 * | 12/2007 | Bauregger et al. | 342/357.02 |
| 2009/0171583 A1 * | 7/2009 | DiEsposti | 701/213 |

* cited by examiner

*Primary Examiner*—Dao L Phan
(74) *Attorney, Agent, or Firm*—Mark E. Brown

(57) ABSTRACT

A GNSS system includes a receiver connected to an external mass storage device. Applications for the system, including GNSS data processing methods are also disclosed. The external storage device can comprise a flash (thumb) drive, which can be connected to the receiver via a USB interconnection.

20 Claims, 2 Drawing Sheets

GNSS RECEIVER AND EXTERNAL STORAGE DEVICE SYSTEM AND GNSS DATA PROCESSING METHOD

CROSS-REFERENCE TO RELATED APPLICATION

This application claims priority in U.S. Provisional Patent Application Ser. No. 60/978,276, filed Oct. 8, 2007, which is incorporated herein by reference.

BACKGROUND OF THE INVENTION

1. Field of the Invention

The present invention relates generally to GNSS receivers, and in particular to a GNSS receiver connected to a storage device.

2. Description of the Related Art

Typically, a global navigation satellite system (GNSS, including without limitation GPS, GLONASS, etc.) receiver includes a correlation digital signal processor (DSP) for performing the correlation function required by a GNSS receiver and a general purpose processor for performing such functions as closing code and carrier tracking loops, calculating a GNSS solution, communicating with the user interface, and other generic tasks as required for the particular GNSS application. A GNSS receiver also typically contains a means to output data, often through a serial interface such as RS-232 or serial USB.

A wide variety of digital storage devices are commercially available. For example, universal serial bus (USB) flash drives are NAND-type flash memory data storage devices integrated with USB interfaces. They are typically small, lightweight, removable and rewritable. Memory capacities for USB flash drives currently range from 32 megabytes up to at least 8 gigabytes. Capacity is limited only by current flash memory densities, although cost per megabyte may increase rapidly at higher capacities due to the expensive components.

USB flash drives, which are sometimes referred to as thumb drives, offer potential advantages over other portable storage devices, particularly floppy disks. For example, their advantages generally include relatively large capacities, compactness, speed, self-powering, durability and reliability due to their lack of moving parts. Computers, including desktop and laptop (notebook) personal computer (PC) units, are commonly equipped with one or more USB ports. USB flash drives use the USB mass storage standard, which is supported natively by modern operating systems such as Windows, Mac OS X, Linux, and Unix. Flash drives are increasingly becoming a preferred means of data transfer, backup and storage.

USB is a polling technology. The host device (typically a PC) polls all client devices on the USB bus to determine if they need servicing. Servicing consists of either sending data to a USB endpoint or receiving data from a USB endpoint. A client device cannot initiate transactions; it can only respond to requests from a USB host.

High-end GNSS receivers and some low-end GNSS receivers are capable of outputting raw measurements such as pseudorange, (integrated) carrier phase, Doppler, and/or satellite navigation message data such as satellite ephemeris parameters, satellite clock correction parameters and ionosphere delay parameters. These receivers may output in a proprietary format or use commonly known RINEX format. In the past, output has typically been over a communication link such as RS-232, USB, or Ethernet.

Currently many of the general purpose processors that are used in GNSS receivers do not have hardware controllers or software that allows them to act as a USB host device. Some higher end processors, such as Freescale's MX31 processor, do include controllers that allow them to be USB hosts. In the exemplary embodiment, the Freescale MX31 processor is used as the GNSS receiver's processor since it supports the USB host functionality and also incorporates high performance vector floating point for rapid calculation of GNSS solutions.

Post-processing software using raw GNSS observations can significantly improve positioning accuracy. With the right equipment and under the right conditions, one can achieve decimeter, centimeter or even millimeter level positioning. Such processing requires data to be collected from at least two GNSS receivers, one of which is at a known position. Various methods of post-processing are known in the art.

In order to post-process such information, a system must output raw measurement data from a GNSS receiver, store this output data to a file (typically on a PC) and finally post-process the data using specialized software designed to perform functions that are difficult to do in real-time, including the simultaneous processing of data from multiple receivers, forward and backward filtering, use of precise orbits, and improved ionosphere and troposphere models.

With proper modeling of the ionosphere and troposphere it is possible to process baselines of several hundred kilometers in length, especially when using dual frequency equipment. Use of precise orbit files, for example, those in SP3 format from the International GNSS Service (IGS), virtually eliminates the effect of broadcast orbital errors on longer baselines. Ionosphere-free float solutions allow for accuracies of a few decimeters with tens of minutes of data over a thousand kilometers. Fixed solutions are sometimes possible with observations spanning several hours over a baseline several hundred kilometers in length.

What is needed is a way to output data for post processing and other types of data directly from a GNSS receiver to a USB Flash Drive, thus avoiding bottlenecks of conventional communication links, and furthermore, simplifying the data logging process by avoiding the use of external computers.

Therefore, the design criteria for GNSS receiver external storage systems would preferably included minimizing overall size and cost, and maximizing the capacity, speed and compatibility with common computer system configurations. Previous GNSS receiver and external storage device systems have not provided the advantages and features of the present invention.

SUMMARY OF THE INVENTION

Aspects of the present invention include methods and applications of using and coupling a USB flash drive storage device with a GNSS receiver, for example a GPS receiver. The combination of a GNSS receiver and a USB flash drive lends itself to many applications that were difficult or inconvenient using previous methods of direct serial output.

It is therefore an object of this invention to provide a simple means to store GNSS measurement data to a file for later post-processing without the use of an external computer such as a PC, but while maintaining compatibility with a PC and while providing a mechanism for easy transfer of data to a PC for post processing.

It is also an object of this invention to provide a means to store data, including map data or data for analysis to a USB flash drive directly from a GNSS receiver.

It is an object of this invention to provide a means to upload firmware directly from a USB flash drive to a GNSS receiver without the use of an external PC.

It is an object of the present invention to allow for parameter data to be uploaded to a GNSS receiver from a USB flash drive.

It is yet another object of the invention that a USB flash drive provides a simple means to store GNSS/GPS measurement data to a file for later post-processing by a GNSS receiver itself where the method avoids the use of a PC altogether.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. The words "inwardly" and "outwardly" refer to directions toward and away from, respectively, the geometric center of the embodiment being described and designated parts thereof. Said terminology will include the words specifically mentioned, derivatives thereof and words of similar meaning.

II. GNSS Systems with External Storage Devices

Figure 1:
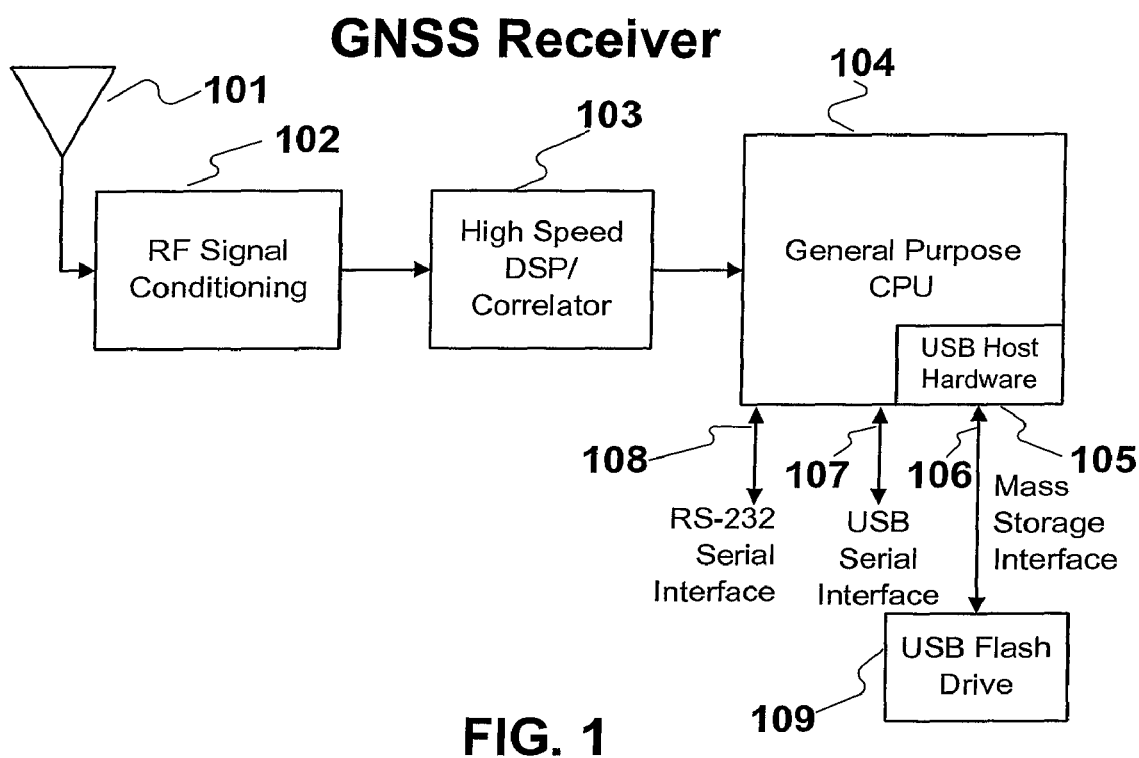
FIG. 1 is a schematic diagram of a system including a generic GNSS receiver and a USB flash drive comprising an aspect of the present invention.

Referring to the drawings in more detail, FIG. 1 shows an exemplary depiction of a generic GNSS receiver that supports a USB flash drive. An antenna 101 is connected an RF signal conditioning portion 102. The RF data is shown-converted, sampled and then fed to a high-speed digital signal processing (DSP) correlator 103 which performs correlations on the received GNSS signals for eventual tracking. Tracking and positioning software reside in a general purpose CPU 104. The CPU supports a USB host hardware interface 105 which communicates to a USB flash drive 109 through a mass storage interface 106. Also supported are a generic RS-232 interface 108 and a generic USB serial interface 107.

The software enabling USB host capability is standard in PC-based operating systems but is not present in many current real-time operating systems (RTOS) used in GNSS receivers. Therefore this capability and associated software are added to the RTOS of the GNSS receiver. The RTOS is designed to include a hardware abstraction layer (HAL) along with higher level software to enable USB host capability. The purpose of the HAL is to create an interface between the USB host controller hardware and the upper level USB software.

A special consideration of USB technology in a GPS receiver is that USB functionality must not impact the ability of the GNSS receiver to deliver on-time location solutions. To obtain a location solution, the receiver must track the code and carrier phase of the satellite generated GPS signals. It is often the duty of a general purpose CPU to close code and carrier phase tracking loops. This is usually done on a fixed time interval (interrupt) basis. This time basis must be maintained so that the characteristics of the code and carrier tracking loops remain consistent. That implies that any USB activities must not impact the interrupt servicing of the code and carrier tracking loops. Therefore, the embedded USB host software that is divided between the HAL and the upper level software consist of interrupt service routines (ISRs) and delayed service routines (DSRs). The ISRs complete their tasks quickly so as not to impact the servicing of the code and carrier tracking loops. The USB ISRs are the interface between the upper level USB software and the HAL. The USB DSRs handle all USB activities that are not handled by the ISRs. These DSRs will be executed on a time slice basis as dictated by the RTOS.

Figure 2:
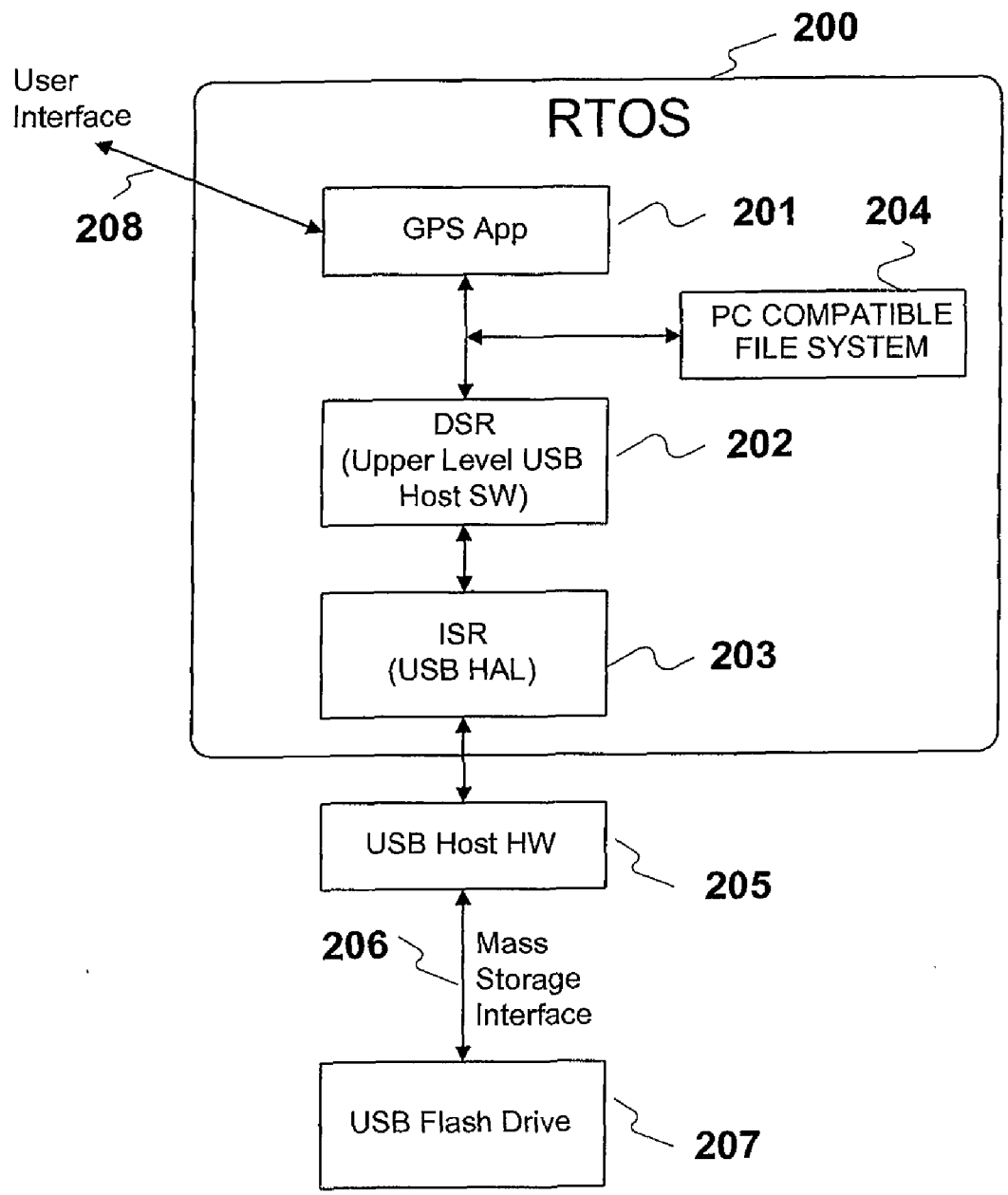
FIG. 2 is a schematic diagram of another system including a real-type operating system (RTOS) for hosting a GNSS/GPS application and USB functionality for supporting a flash drive.

FIG. 2 depicts the RTOS 200 which hosts the GPS application 201 as well the USB functionality necessary for the flash drive support. The flash drive support includes the DSR 202 as well as the ISR low level HAL routines residing in the ISR 203. There is also a software module comprising a PC compatible file system 204 to support a file system on the USB flash drive 207. The ISR software communicates with USB host hardware 205 and data transfer to and from a USB flash drive 207 is through a mass storage device serial interface 206.

Any files that the GNSS receiver reads from or writes to a USB flash (thumb) drive 109, 207 must also be compatible with a typical PC operating system. This requires the GNSS receiver software to include a PC compatible file system 204. This is something that is not typically included in an RTOS.

A method of selecting and naming data log files is utilized that employs a user (command) interface 208 through one of the GNSS receiver, RS-232 or conventional USB interfaces. Various messages can be turned on and assigned to be written to a particular file. All messages that can be output to an RS-232 port can also be written to a file on the USB flash drive 109, 207.

III. Specific Methods and Applications

A benefit of a large USB flash drive is that it can hold large data files for later post-processing, which can involve days or even weeks worth of GNSS data. For example, a simple means is provided for storing GNSS measurement data to a file for later post-processing without the use of an external computer such as a PC for logging of the data. A USB flash drive maintains compatibility with a PC and provides a mechanism for easy transfer of data to a PC for post-processing.

Data logging is also advantageous for trouble shooting a GNSS device. For example, a stream of all GNSS receiver observables needed to reconstruct receiver performance off-line (in non-real time) may be logged for playback. Modern high-end receivers may run at solution rates of 20 Hz or more and can output significant amounts of data. The data rates may be too high for conventional RS-232. However, by utilizing the present invention, high speed data for trouble shooting or analysis may be logged directly to a file on the attached USB Flash drive.

Another application of data logging is simply to log GNSS-derived locations or tracks into a file for display on a map, perhaps to document proper coverage when applying chemicals in an agricultural application. New mapping technology, such as Google Earth, has an expanding API which allows data to be presented in a variety of ways. Real-time logging of track, swath and area calculations and colorizations based on speed or altitude can be logged to the USB flash drive in a format that will load automatically by a mapping application such as Google Earth.

In addition to map-formatted data, other types of data that may be logged to the USB flash drive include: real-time aircraft tracking; raw code and carrier observables; range/pitch/yaw information; XYZ position; speed and time.

An application of this invention is to provide a means to store data, including map data or data for analysis to a USB flash drive directly from a GNSS receiver. In existing GNSS receivers, the means of uploading firmware or FGPA images into a GNSS receiver often involve the use of laptop computers to run the uploading program and to deliver the image file to be uploaded. However, a laptop computer is not always readily available. It would be more desirable to use a compact, low-cost means of delivering the firmware update while avoiding the use of a laptop computer. To realize this objective, firmware within the GPS receiver can detect the insertion of the USB flash drive and further detect that a new firmware file resides on the USB flash drive by scanning the drive and looking for a particular signature. The receiver software can then automatically upload the firmware into RAM and then invoke an internal process of programming the firmware into the receiver's own nonvolatile memory.

It is yet another application of this invention to provide a means to upload firmware directly from a USB flash drive to GPS receiver without the use of an external PC. Differential GPS (DGPS) provides one means of correcting a GNSS receiver's measurements to provide increased accuracy. In some situations, DGPS is not readily available, however, there still may be data that can be delivered to a GNSS receiver less frequently (say once per day) than typical DGPS and still allow for increased accuracy. Such data may include precise orbit files, ionosphere modeling parameters, differential code biases such as the P1-C1 and P1-P2 code biases provided by Center for Orbit Determination in Europe (CODE). Data may be downloaded from the World Wide Web (Internet) once per day, copied to a USB flash drive, and then the flash drive removed from the PC and inserted into the host USB port on the GNSS receiver. Positioning software within the receiver is designed to utilize the aforementioned data to enhance positioning accuracy.

An example of a positioning method that would benefit from the use of a USB Flash drive is precise point positioning (PPP). The details of PPP have been discussed in literature including the work of Dr. Yang Gao and colleagues at the University of Calgary. Dr Gao's methods can be realized by the use of USB flash drives to upload precise orbits and clock files into the GNSS receiver. Many organizations, including the International GPS service (IGS), Natural Resources Canada (NRCan) and Jet Propulsion Laboratory (JPL), provide such process orbit and clock files. These organizations are accessible from a PC via the Internet, where files can be downloaded and saved to the USB flash drive for transport to the GNSS receiver.

A parameter file can also be used to set up the logging options automatically on power-up from the GNSS application. These options can include the various data messages to be polled and the format to be logged, logging rate, start and end times, automated logging-on, exceeding speed limits or leaving complex geo-fence polygons.

Another application of the present invention is to allow for parameter data to be uploaded to a GNSS receiver from a USB flash drive. In yet another application of the invention, the USB flash drive provides a simple means to store GPS measurement data to a file for later post-processing by the GNSS receiver itself. This avoids a PC altogether. This is particularly suited for PPP applications that involve data from a single GNSS receiver. Here precise orbit and clock data may first be stored on the USB flash drive, then the flash drive inserted into the GNSS receiver where it is brought to the field to gather data. Once the desired amount of data has been gathered, the GNSS receiver is placed in a mode where it invokes post-processing algorithms on the stored data.

It should be understood that the current preferred embodiments refer to so-called universal serial bus (USB) thumb drives but could include any other technology that allows connection of a mass storage device directly or wirelessly to a GPS receiver. Other possibilities include FireWire, wireless USB, or any other enabling technology.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. A method of operating a GNSS signal processing system, for processing GNSS signals from multiple satellite sources received by a receiver including a digital signal processor (DSP) and a general purpose central processing unit (CPU), which method comprises the steps of:

providing said CPU with USB host hardware;
providing said CPU with a USB serial interface;
providing the CPU with random access memory (RAM);
providing the receiver with nonvolatile memory;
providing said receiver with a real-time operating system (RTOS) including a hardware abstraction layer (HAL) and upper-level USB software enabling USB host capability;
interfacing the USB host controller hardware and the USB software with the HAL;
embedding USB host software in said CPU and including interrupt service routines (ISRs) and delayed service routines (DSRs) in said USB host software;
handling USB activities between the upper-level USB software and the HAL with the ISRs;
handling with the DSRs USB activities not handled by the ISRs;
executing the DSRs on a time slice basis as dictated by the RTOS;
providing the GNSS receiver software with a PC compatible file system; and
receiving raw analog GNSS ranging and timing signals;
downconverting the raw analog GNSS signals to digital signals with an AD converter;
correlating the digital signals with the digital signal processor (DSP);
closing code and carrier tracking loops with the CPU on a fixed time interval (interrupt) basis;
calculating a GNSS solution and communicating the GNSS solution with a user interface;
providing output signals representing the GNSS positioning solution on a USB;
providing compatibility for the RTOS and the files read from or written to the external USB storage device;
processing said output signals in real-time;
transferring said output signals over a mass storage interface between said USB host hardware and said storage device;
storing said output signals on an external USB storage device; and
post-processing said externally stored data with an external computer.

2. The method of claim 1, which includes the additional steps of:
provide said output signals corresponding to one or more of pseudorange, integrated carrier phase, Doppler, satellite navigation message data, satellite ephemeris parameters, satellite clock correction parameters and ionosphere delay parameters.

3. The method of claim 1, which includes the additional steps of:
providing said output signals in a proprietary format or over a communication link.

4. The method of claim 1, which includes the additional step of calculating a GNSS solution with a vector floating point.

5. The method of claim 1, which includes the additional step of uploading firmware directly from an external USB storage device to the GNSS receiver.

6. The method of claim 1, which includes the additional steps of storing data comprising map data or data for analysis.

7. The method of claim 1, which includes the additional steps of performing tracking and positioning functions using the converted GNSS positioning signals.

8. The method of claim 1, which includes the additional steps of:
providing a user command interface; and
selecting and naming data log files through said user command interface through one of said GNSS receiver, RS-232 or USB interface.

9. The method of claim 1, which includes the additional steps of:
said CPU turning on messages;
assigning said messages to be written to particular files;
outputting said messages to an output port connected to said CPU; and
writing said messages to said external USB storage device.

10. The method of claim 1 wherein said external USB storage device comprises a flash drive.

11. The method of claim 1, which includes the additional steps of:
logging a stream of GNSS receiver observables for playback;
reconstructing performance of said receiver off-line (in non-real time); and
troubleshooting said GNSS system with said receiver performance reconstructed from said receiver observables.

12. The method of claim 1, which includes the additional steps of:
logging data comprising GNSS-derived locations or tracks into a file; and
displaying said date on a map.

13. The method of claim 12, which includes the additional steps of:
real-time logging track, swath and/or area calculations and/or colorizations;
loading a format from a mapping application; and
providing a mapping output using said mapping format.

14. The method of claim 1, which includes the additional steps of:
monitoring an agricultural chemical-applying operation with said system;
logging chemical application coverages in GNSS-defined field areas; and
mapping said chemical application coverages on said field areas.

15. The method of claim 1, which includes the additional steps of logging to the external storage device data corresponding to one or more of:
real-time aircraft tracking; roll code and carrier observables; range/page/yaw information; XYZ position; speed; and time.

16. The method of claim 1, which includes the additional step of:
loading firmware on an external USB storage device;
providing said firmware with a signature;
connecting the external USB storage device to the CPU;
scanning the external USB storage device;
detecting the firmware signature;
uploading the firmware into the CPU RAM; and
programming the firmware into the receiver's nonvolatile memory.

17. The method of claim 1, which includes the additional steps of:
loading GNSS correction date comprising one or more of precise orbit files, ionosphere modeling parameters, and differential code biases onto said external storage device from the worldwide web (Internet); and
utilizing said GNSS correction date for enhancing positioning accuracy with said GNSS system.

18. The method of claim 1, which includes the additional steps of:
downloading precise GNSS orbit and clock files to a computer via the Internet;
saving said precise GNSS orbit and clock files to the external storage device;
uploading to said receiver said precise GNSS orbit and clock files from the external storage device;
gathering data in the field with said GNSS system; and
performing GNSS precise point positioning (PPP) with said system using said precise GNSS orbit and clock data.

19. The method of claim 1, which includes the additional steps of:
creating a parameter file including data messages corresponding to one or more of format to be logged, logging rate, start and end times, automated logging-on, exceeding speed limits and leaving complex geo-fence polygons;
detecting the parameter file with the CPU; and
accessing said parameter file with said CPU on power-up from a GNSS application.

20. The method of claim 1, which includes the additional steps of:
downloading logged GNSS data from said external USB storage device onto a remote personal computer with suitable USB interface;
comparing logged data with existing data; and
troubleshooting said GNSS receiver based on the results of the compared data.

* * * * *